(12) United States Patent
Bayer et al.

(10) Patent No.: US 8,677,180 B2
(45) Date of Patent: Mar. 18, 2014

(54) SWITCH FAILOVER CONTROL IN A MULTIPROCESSOR COMPUTER SYSTEM

(75) Inventors: Gerd K. Bayer, Boeblingen (DE); David F. Craddock, New Paltz, NY (US); Thomas A. Gregg, Highland, NY (US); Michael Jung, Frankfurt am Main (DE); Andreas Kohler, Boeblingen (DE); Elke G. Nass, Boeblingen (DE); Oliver G. Schlag, Weil im Schoenbuch (DE); Peter K. Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/821,256

(22) Filed: Jun. 23, 2010

(65) Prior Publication Data

US 2011/0320861 A1    Dec. 29, 2011

(51) Int. Cl.
    *G06F 11/00*    (2006.01)
(52) U.S. Cl.
    USPC ............. 714/13; 714/4.11; 714/4.2; 714/11
(58) Field of Classification Search
    USPC ...................... 714/4.11, 4.2, 11, 13
    See application file for complete search history.

(56) References Cited

U.S. PATENT DOCUMENTS

| 4,104,539 A | 8/1978 | Hase |
| 4,644,443 A | 2/1987 | Swensen et al. |
| 5,027,254 A | 6/1991 | Corfits et al. |
| 5,170,472 A | 12/1992 | Cwiakala et al. |
| 5,282,274 A | 1/1994 | Liu |
| 5,430,856 A | 7/1995 | Kinoshita |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |

(Continued)

FOREIGN PATENT DOCUMENTS

| CN | 1885096 A | 12/2006 |
| CN | 101196615 A | 6/2008 |

(Continued)

OTHER PUBLICATIONS

Final Office Action Received Mar. 2, 2012 for U.S. Appl. No. 12/821,221.

(Continued)

*Primary Examiner* — Joshua P Lottich
(74) *Attorney, Agent, or Firm* — Cantor Colburn LLP; Steven Chiu (57) ABSTRACT

A system and a method for failover control comprising: maintaining a primary device table entry (DTE) in a first table activated for a first adapter in communication with a first processor node having a first root complex via a first switch assembly and maintaining a secondary DTE in standby for a second adapter in communication with a second processor node having a second root complex via a second switch assembly; maintaining a primary DTE in a second table activated for the second adapter and maintaining a secondary DTE in standby for the first adapter; and upon a failover, updating the secondary DTE in the first table as an active entry for the second adapter and forming a path to enable traffic to route from the second adapter through the second switch assembly over to the first switch assembly and up to the first root complex of the first processor node.

24 Claims, 7 Drawing Sheets

(56) References Cited

U.S. PATENT DOCUMENTS

| | | |
|---|---|---|
| 5,574,873 A | 11/1996 | Davidian |
| 5,600,805 A | 2/1997 | Fredericks et al. |
| 5,617,554 A | 4/1997 | Alpert et al. |
| 5,742,785 A | 4/1998 | Stone et al. |
| 5,761,448 A | 6/1998 | Adamson et al. |
| 5,790,825 A | 8/1998 | Traut |
| 5,815,647 A | 9/1998 | Buckland et al. |
| 5,838,960 A | 11/1998 | Harriman, Jr. |
| 5,870,598 A | 2/1999 | White et al. |
| 5,949,646 A | 9/1999 | Lee et al. |
| 5,960,213 A | 9/1999 | Wilson |
| 5,963,425 A | 10/1999 | Chrysler et al. |
| 6,009,261 A | 12/1999 | Scalzi et al. |
| 6,023,736 A | 2/2000 | Lambeth et al. |
| 6,067,595 A | 5/2000 | Lindenstruth |
| 6,112,311 A * | 8/2000 | Beardsley et al. ............ 714/3 |
| 6,205,530 B1 | 3/2001 | Kang |
| 6,301,133 B1 | 10/2001 | Cuadra et al. |
| 6,308,255 B1 | 10/2001 | Gorishek, IV et al. |
| 6,330,656 B1 | 12/2001 | Bealkowski et al. |
| 6,341,064 B1 | 1/2002 | Bradley |
| 6,349,380 B1 | 2/2002 | Shahidzadeh et al. |
| 6,408,347 B1 | 6/2002 | Smith et al. |
| 6,456,498 B1 | 9/2002 | Larson et al. |
| 6,538,881 B1 | 3/2003 | Jeakins et al. |
| 6,544,311 B1 | 4/2003 | Walton et al. |
| 6,594,148 B1 | 7/2003 | Nguyen et al. |
| 6,595,018 B2 | 7/2003 | Goth et al. |
| 6,625,169 B1 | 9/2003 | Tofano |
| 6,625,648 B1 | 9/2003 | Schwaller et al. |
| 6,643,727 B1 | 11/2003 | Arndt et al. |
| 6,721,813 B2 | 4/2004 | Owen et al. |
| 6,816,590 B2 | 11/2004 | Pike et al. |
| 6,845,428 B1 * | 1/2005 | Kedem ........................ 711/117 |
| 6,845,469 B2 | 1/2005 | Hicks et al. |
| 6,927,975 B2 | 8/2005 | Crippen et al. |
| 6,950,438 B1 | 9/2005 | Owen et al. |
| 6,973,510 B2 | 12/2005 | Arndt et al. |
| 7,003,615 B2 | 2/2006 | Chiu et al. |
| 7,004,233 B2 | 2/2006 | Hasegawa et al. |
| 7,007,099 B1 | 2/2006 | Donati et al. |
| 7,032,052 B2 | 4/2006 | Sauber et al. |
| 7,042,734 B2 | 5/2006 | Hensley et al. |
| 7,053,502 B2 | 5/2006 | Aihara et al. |
| 7,062,594 B1 | 6/2006 | Sardella et al. |
| 7,075,788 B2 | 7/2006 | Larson et al. |
| 7,093,155 B2 | 8/2006 | Aoki |
| 7,096,308 B2 | 8/2006 | Main et al. |
| 7,103,808 B2 | 9/2006 | Kitamorn et al. |
| 7,107,331 B2 | 9/2006 | Gava et al. |
| 7,107,495 B2 | 9/2006 | Kitamorn et al. |
| 7,134,040 B2 * | 11/2006 | Ayres ........................... 714/4.3 |
| 7,152,136 B1 | 12/2006 | Charagulla |
| 7,163,546 B2 | 1/2007 | Mirizzi et al. |
| 7,206,946 B2 | 4/2007 | Sakakibara et al. |
| 7,219,181 B2 | 5/2007 | Carty |
| 7,260,620 B1 | 8/2007 | Halasz |
| 7,313,643 B2 | 12/2007 | Sakurai et al. |
| 7,370,224 B1 | 5/2008 | Jaswa et al. |
| 7,447,934 B2 | 11/2008 | Dasari et al. |
| 7,457,900 B2 | 11/2008 | Panesar |
| 7,464,174 B1 | 12/2008 | Ngai |
| 7,478,167 B2 | 1/2009 | Ould-Brahim et al. |
| 7,480,303 B1 | 1/2009 | Ngai |
| 7,519,647 B2 | 4/2009 | Carlough et al. |
| 7,525,957 B2 | 4/2009 | Scherer et al. |
| 7,535,828 B2 * | 5/2009 | Raszuk et al. ............... 370/219 |
| 7,546,386 B2 | 6/2009 | Arndt et al. |
| 7,558,348 B1 | 7/2009 | Liu et al. |
| 7,565,463 B2 | 7/2009 | Johnsen et al. |
| 7,594,144 B2 | 9/2009 | Brandyberry et al. |
| 7,613,847 B2 | 11/2009 | Kjos et al. |
| 7,617,340 B2 | 11/2009 | Gregg |
| 7,617,345 B2 | 11/2009 | Clark et al. |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,660,912 B2 | 2/2010 | Gregg |
| 7,664,991 B1 | 2/2010 | Gunda et al. |
| 7,676,617 B2 | 3/2010 | Kloeppner |
| 7,729,316 B2 | 6/2010 | Uhlik |
| 7,836,254 B2 | 11/2010 | Gregg et al. |
| 7,873,851 B1 | 1/2011 | Linnell et al. |
| 7,975,076 B2 | 7/2011 | Moriki et al. |
| 8,032,684 B2 * | 10/2011 | Pettey et al. ................. 710/311 |
| 8,041,811 B2 | 10/2011 | Calippe et al. |
| 8,046,627 B2 * | 10/2011 | Takubo ...................... 714/4.11 |
| 8,082,466 B2 * | 12/2011 | Tanaka et al. ................ 714/6.3 |
| 8,140,917 B2 | 3/2012 | Suetsugu et al. |
| 8,510,592 B1 | 8/2013 | Chan |
| 2002/0112067 A1 | 8/2002 | Chang et al. |
| 2003/0056155 A1 | 3/2003 | Austen et al. |
| 2003/0058618 A1 | 3/2003 | Soetemans et al. |
| 2003/0097503 A1 | 5/2003 | Huckins |
| 2003/0177221 A1 | 9/2003 | Ould-Brahim et al. |
| 2003/0198180 A1 | 10/2003 | Cambron |
| 2003/0200477 A1 * | 10/2003 | Ayres ............................... 714/2 |
| 2004/0024905 A1 | 2/2004 | Liao et al. |
| 2004/0088604 A1 | 5/2004 | Bland et al. |
| 2004/0117534 A1 | 6/2004 | Parry et al. |
| 2004/0130868 A1 | 7/2004 | Schwartz et al. |
| 2004/0133819 A1 | 7/2004 | Krishnamurthy et al. |
| 2004/0136130 A1 | 7/2004 | Wimmer et al. |
| 2004/0199700 A1 | 10/2004 | Clayton |
| 2005/0033895 A1 | 2/2005 | Lueck et al. |
| 2005/0071472 A1 | 3/2005 | Arndt et al. |
| 2005/0091438 A1 | 4/2005 | Chatterjee |
| 2005/0116546 A1 | 6/2005 | Zeighami et al. |
| 2005/0144533 A1 | 6/2005 | LeVangia et al. |
| 2005/0146855 A1 | 7/2005 | Brehm et al. |
| 2005/0160214 A1 | 7/2005 | Sauber et al. |
| 2005/0162830 A1 | 7/2005 | Wortman et al. |
| 2005/0182862 A1 | 8/2005 | Ritz et al. |
| 2005/0213513 A1 | 9/2005 | Ngo et al. |
| 2005/0276017 A1 | 12/2005 | Aziz et al. |
| 2005/0289271 A1 | 12/2005 | Martinez et al. |
| 2005/0289278 A1 | 12/2005 | Tan et al. |
| 2006/0067069 A1 | 3/2006 | Heard et al. |
| 2006/0085150 A1 | 4/2006 | Gorin |
| 2006/0085573 A1 | 4/2006 | Pike et al. |
| 2006/0087813 A1 | 4/2006 | Becker et al. |
| 2006/0087814 A1 | 4/2006 | Brandon et al. |
| 2006/0095607 A1 | 5/2006 | Lim et al. |
| 2006/0195644 A1 | 8/2006 | Arndt et al. |
| 2006/0206639 A1 | 9/2006 | Tee et al. |
| 2006/0230208 A1 | 10/2006 | Gregg et al. |
| 2006/0236054 A1 | 10/2006 | Kitamura |
| 2006/0253619 A1 | 11/2006 | Torudbakken et al. |
| 2006/0288130 A1 | 12/2006 | Madukkarumukumana et al. |
| 2006/0291447 A1 | 12/2006 | Siliquini et al. |
| 2007/0069585 A1 | 3/2007 | Bosco et al. |
| 2007/0073955 A1 | 3/2007 | Murray et al. |
| 2007/0078996 A1 | 4/2007 | Chen et al. |
| 2007/0115230 A1 | 5/2007 | Tajiri et al. |
| 2007/0136554 A1 | 6/2007 | Biran et al. |
| 2007/0168636 A1 | 7/2007 | Hummel et al. |
| 2007/0183393 A1 | 8/2007 | Body et al. |
| 2007/0186074 A1 | 8/2007 | Bradford et al. |
| 2007/0226386 A1 | 9/2007 | Sharp et al. |
| 2007/0226523 A1 | 9/2007 | Chang |
| 2007/0234018 A1 | 10/2007 | Feiste |
| 2007/0239925 A1 | 10/2007 | Koishi |
| 2007/0245041 A1 | 10/2007 | Hua et al. |
| 2007/0271559 A1 | 11/2007 | Easton et al. |
| 2007/0273018 A1 | 11/2007 | Onozuka et al. |
| 2007/0274039 A1 | 11/2007 | Hamlin |
| 2008/0043405 A1 | 2/2008 | Lee et al. |
| 2008/0069141 A1 | 3/2008 | Bonaguro et al. |
| 2008/0091851 A1 | 4/2008 | Sierra |
| 2008/0091868 A1 | 4/2008 | Mizrachi et al. |
| 2008/0091915 A1 | 4/2008 | Moertl et al. |
| 2008/0114906 A1 | 5/2008 | Hummel et al. |
| 2008/0126648 A1 | 5/2008 | Brownlow et al. |
| 2008/0126652 A1 | 5/2008 | Vembu et al. |

(56) References Cited

U.S. PATENT DOCUMENTS

| | | | |
|---|---|---|---|
| 2008/0147943 | A1 | 6/2008 | Freimuth et al. |
| 2008/0148295 | A1 | 6/2008 | Freimuth et al. |
| 2008/0162865 | A1 | 7/2008 | Koufaty et al. |
| 2008/0168208 | A1 | 7/2008 | Gregg |
| 2008/0189577 | A1 | 8/2008 | Arndt et al. |
| 2008/0209114 | A1 | 8/2008 | Chow et al. |
| 2008/0222406 | A1 | 9/2008 | Tabuchi |
| 2008/0235425 | A1 | 9/2008 | Belmar et al. |
| 2008/0239687 | A1 | 10/2008 | Leigh et al. |
| 2008/0239945 | A1 | 10/2008 | Gregg |
| 2008/0259555 | A1 | 10/2008 | Bechtolsheim et al. |
| 2008/0263246 | A1 | 10/2008 | Larson et al. |
| 2008/0270853 | A1 | 10/2008 | Chagoly et al. |
| 2008/0288661 | A1 | 11/2008 | Galles |
| 2009/0037682 | A1 | 2/2009 | Armstrong et al. |
| 2009/0070760 | A1 | 3/2009 | Khatri et al. |
| 2009/0125666 | A1 | 5/2009 | Freking et al. |
| 2009/0144462 | A1 | 6/2009 | Arndt et al. |
| 2009/0144731 | A1 | 6/2009 | Brown et al. |
| 2009/0182966 | A1 | 7/2009 | Greiner et al. |
| 2009/0182969 | A1 | 7/2009 | Norgaard et al. |
| 2009/0210527 | A1 | 8/2009 | Kawato |
| 2009/0210646 | A1 | 8/2009 | Bauman et al. |
| 2009/0222814 | A1 | 9/2009 | Astrand |
| 2009/0234987 | A1 | 9/2009 | Lee et al. |
| 2009/0240849 | A1 | 9/2009 | Corneli et al. |
| 2009/0249039 | A1 | 10/2009 | Hook et al. |
| 2009/0276774 | A1 | 11/2009 | Kinoshita |
| 2009/0328035 | A1 | 12/2009 | Ganguly |
| 2010/0005234 | A1 | 1/2010 | Ganga et al. |
| 2010/0027559 | A1 | 2/2010 | Lin et al. |
| 2010/0077117 | A1 | 3/2010 | Asnaashari |
| 2010/0115329 | A1* | 5/2010 | Tanaka et al. ............... 714/5 |
| 2010/0146089 | A1* | 6/2010 | Freimuth et al. ............ 709/222 |
| 2010/0157463 | A1 | 6/2010 | Arizono et al. |
| 2010/0211714 | A1 | 8/2010 | LePage |
| 2010/0312894 | A1 | 12/2010 | Awad et al. |
| 2011/0131359 | A1* | 6/2011 | Pettey et al. ............... 710/306 |
| 2011/0320653 | A1 | 12/2011 | Lais et al. |
| 2011/0320675 | A1 | 12/2011 | Gregg et al. |

FOREIGN PATENT DOCUMENTS

| | | |
|---|---|---|
| CN | 101571631 A | 11/2009 |
| CN | 102193239 a | 9/2011 |
| JP | 57191826 | 11/1982 |
| JP | 5981724 | 5/1984 |
| JP | 6279557 | 4/1987 |
| JP | 0553973 | 3/1993 |
| JP | 2007087082 A | 4/2007 |
| JP | 2007241526 A | 9/2007 |
| JP | 2010134627 A | 6/2010 |
| WO | WO9600940 | 11/1996 |
| WO | 2009027189 A1 | 3/2008 |

OTHER PUBLICATIONS

International Search Report for PCT/EP2011/059810, Sep. 14, 2011.
Non Final Office Action dated Sep. 22, 2011 for U.S. Appl. No. 12/821,221.
PCI Express Base Specification Rev 1.0a, Apr. 15, 2003 p. 1-2, 31, 35-36, 43-44, 49-51, 55, 59-62, 74, 101.
Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.
J. Regula, "Using Non-transparent Bridging in PCI Express Systems", PLX Technology, Inc., pp. 1-31, Jun. 1, 2004.
Jack Regula "Ethernet Tunneling through PCI Express Inter-Processor Communication, Low Latency Storage IO Source"; www.wwpi.com; Publisher: Computer Technology Review, Jan. 19, 2009.
Robert F. Kern, "IBM System z & DS8000 Technology Synergy", IBM ATS Americas Disk Storage; Jul. 21, 2009, pp. 1-25.
Szwed et al.; "Managing Connected PCI Express Root Complexes"; Dated: Dec. 23, 2009—6 pages.
Final Office Action mail date Jun. 15, 2011 for U.S. Appl. No. 12/821,221.
U.S. Appl. No. 12/821,221, filed Jun. 23, 2010.
U.S. Appl. No. 12/821,222, filed Jun. 23, 2010.
U.S. Appl. No. 12/821,224, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,242, filed Jun. 23, 2010.
U.S. Appl. No. 12/821,243, filed Jun. 23, 2010.
U.S. Appl. No. 12/821,245, filed Jun. 23, 2010.
U.S. Appl. No. 12/821,247, filed Jun. 23, 2010.
U.S. Appl. No. 12/821,248, filed Jun. 23, 2010.
U.S. Appl. No. 12/821,250, filed Jun. 23, 2010.
U.S. Appl. No. 12/821,271, filed Jun. 23, 2010.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.
Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages.
892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/6969/<retrieved on Jan. 26, 2010>.
K. Vaidyanathan et al.; "Exploiting RDMA Operations for Providing Efficient Fine-Grained Resource Monitoring in Cluster-Based Servers"; Jun. 2006; pages -10; Downloaded: Apr. 13, 2010 at 18:53:46 UTC from IEEE Xplore. 1-4244-0328-6/06.
Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers-USENIX Annual Teleconference (No. 98); Entitled: "General Purpose Operating System Support for Multiple Page Sizes" 1998; pp. 1-9.
U.S. Appl. No. 12/821,221, Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
Swift, Micael M. et al., "Improving the Reliability of Commodity Operating Systems," ACM Transactions on Computer Systems, vol. 23, No. 1, Feb. 2005, pp. 77-110.
Talluri et al., "A New Page Table for 64-bit Address Spaces," ACM SIGOPS Operating Systems Review, vol. 29, Issue 5 (Dec. 1995), pp. 194-200.
VTdHowTo—Xen Wiki; Downloaded—Apr. 16, 2010; pp. 1-5; http://wiki.xensource.com/xenwiki/VTdHowTo.
Winwood, Simon, et al., "Multiple Page Size Support in the Linux Kernel", Proceedings of Ottawa Linux Symposium, 2002.
Xu, Min et al., "Towards a VMM-based Usage Control Framework for OS Kernel Integrity Protection," SACMAT '07, Jun. 20-22, 2007, Sophia Antipolis, France, pp. 71-80.
z/Architecture Principles of Operation, Feb. 2009; pp. 1-1344.
z/VM: Running Guest Operating Systems, IBM Publication No. SC24-5997-02, Oct. 2001.
Final Office Action dated Jul. 19, 2012 for U.S. Appl. No. 12/821,250.

(56) References Cited

OTHER PUBLICATIONS

Non Final Office Action recieved May 8, 2012 for U.S. Appl. No. 12/821,243.
Non Final Office Action received Mar. 15, 2012 for U.S. Appl. No. 12/821,242.
Non Final Office Action dated Apr. 3, 2012 for U.S. Appl. No. 12/821,226.
Non Final Office Action for U.S. Appl. No. 12/821,224 dated May 15, 2012.
Non-final Office Action dated Jun. 5, 2012 for U.S. Appl. No. 12/821,221.
Notice of Allowance recieved Jun. 1, 2012 for U.S. Appl. No. 12/821,248.
Restriction Requirement received Jun. 18, 2012 for U.S. Appl. No. 12/821,239.
Non Final Office Action received Feb. 16, 2012 for U.S. Appl. No. 12/821,250.
Final Office Action dated Jun. 14, 2013 for U.S. Appl. No. 12/821,239.
Informational Materials for IDS, date May 8, 2013, 4 pages.
International Search Report of the Patent Cooperation Treaty for International Application No. PCT/CN2013/070828, mailing date Apr. 24, 2013, 13 pages.

* cited by examiner

SWITCH FAILOVER CONTROL IN A MULTIPROCESSOR COMPUTER SYSTEM

BACKGROUND

This invention relates generally to processing within a computing environment, and more particularly to switch failover control in a multi-processor computer system.

Today's computing platforms and processing system are moving toward an I/O interconnect topology that provides a single communication path between each peripheral device and the host. These computing platforms and processing systems may use packetized communications within the tree structure. Examples of such computing platforms and processing systems include what is referred to as, for example, peripheral component interconnect (PCI) systems and PCI Express (PCIe) systems. Peripheral devices are discovered by such platforms and systems through an enumeration process performed by a host system element.

I/O adapters or peripheral devices are connected to a primary processor node and to a secondary failover processor node through its I/O expansion network consisting of pairs of interconnected proprietary PCIe fan-output chips (i.e., switches), which can be costly.

BRIEF SUMMARY

An exemplary embodiment is a computer implemented method for failover control within a computer system. The method includes maintaining a primary device table entry (DTE) in a first device table activated for a first adapter in communication with a first host processor node having a first root complex via a first switch assembly and maintaining a secondary DTE in standby for a second adapter in communication with a second host processor node having a second root complex via a second switch assembly; maintaining a primary DTE in a second device table activated for the second adapter and maintaining a secondary DTE in standby for the first adapter; and upon a failover condition, updating the secondary DTE in the first device table as an active entry for the second adapter and forming a failover path to enable traffic to route from the second adapter through the second switch assembly over to the first switch assembly and up to the first root complex of the first host processor node.

Another exemplary embodiment is a computing system for failover control. The system includes a first host processor node with a first root complex in communication with a first adapter via a first switch assembly; a second host processor node with a second root complex in communication with a second adapter via a second switch assembly; a first device table in the first host processor node, the first device table includes a primary device table entry (DTE) activated for the first adapter and a secondary DTE in standby for the second adapter; and a second device table in the second host processor node, the second device table includes a primary (DTE) activated for the second adapter and a secondary DTE in standby for the first adapter; wherein the computing system has a failover condition, in which the secondary DTE in the first device table is updated as an active entry for the second adapter, and in which a failover path is formed and traffic is routed from the second adapter through the second switch assembly over to the first switch assembly and up to the first root complex of the first host processor node.

A further exemplary embodiment is a computer program product for failover control in a computer system. The computer program product includes a tangible storage medium readable by a processing circuit and storing instructions for execution by the processing circuit for performing a method comprising: maintaining a primary device table entry (DTE) in a first device table activated for a first adapter in communication with a first host processor node having a first root complex via a first switch assembly and maintaining a secondary DTE in standby for a second adapter in communication with a second host processor node having a second root complex via a second switch assembly; maintaining a primary DTE in a second device table activated for the second adapter and maintaining a secondary DTE in standby for the first adapter; and upon a failover condition, updating the secondary DTE in the first device table as an active entry for the second adapter and forming a failover path to enable traffic to route from the second adapter through the second switch assembly over to the first switch assembly and up to the first root complex of the first host processor node.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments of the present invention provide systems and methods for failover control in a multi-processor computing system. In an exemplary embodiment, the computing system supports controlled and surprise failover conditions as well as control failback conditions by enabling traffic from a failed processor node to flow over an operational or surviving processor node. One way of establishing if an adapter is operational is described in commonly assigned U.S. patent application Ser. No. 12/821,181, entitled "CONTROLLING THE SELECTIVELY SETTING OF OPERATIONAL PARAMETERS FOR AN ADAPTER" Jun. 23, 2010, which is incorporated by reference herein in its entirety. This can be accomplished using off-the-shelf Peripheral Component Interconnect express (PCIe) fan-out chips (i.e., switches) according to an exemplary embodiment. In accordance with one exemplary embodiment, the computing system has device table entries for each peripheral device at each processor node and assigns unique PCI address routing ranges and unique PCI bus numbers to all the components within the input/output (I/O) expansion network of the computing system. In accordance with an exemplary embodiment, the computing system includes a master function table with function table entries (FTEs) that each represents an end point (peripheral devices) and describes or identifies the active/operational and failover routes between the host (processor node) and the endpoint and indicates to each node which path to use. These exemplary embodiments minimize traffic disruption and failover latencies in a PCIe environment in which the system is implemented in accordance with an exemplary embodiment.

Figure 1:
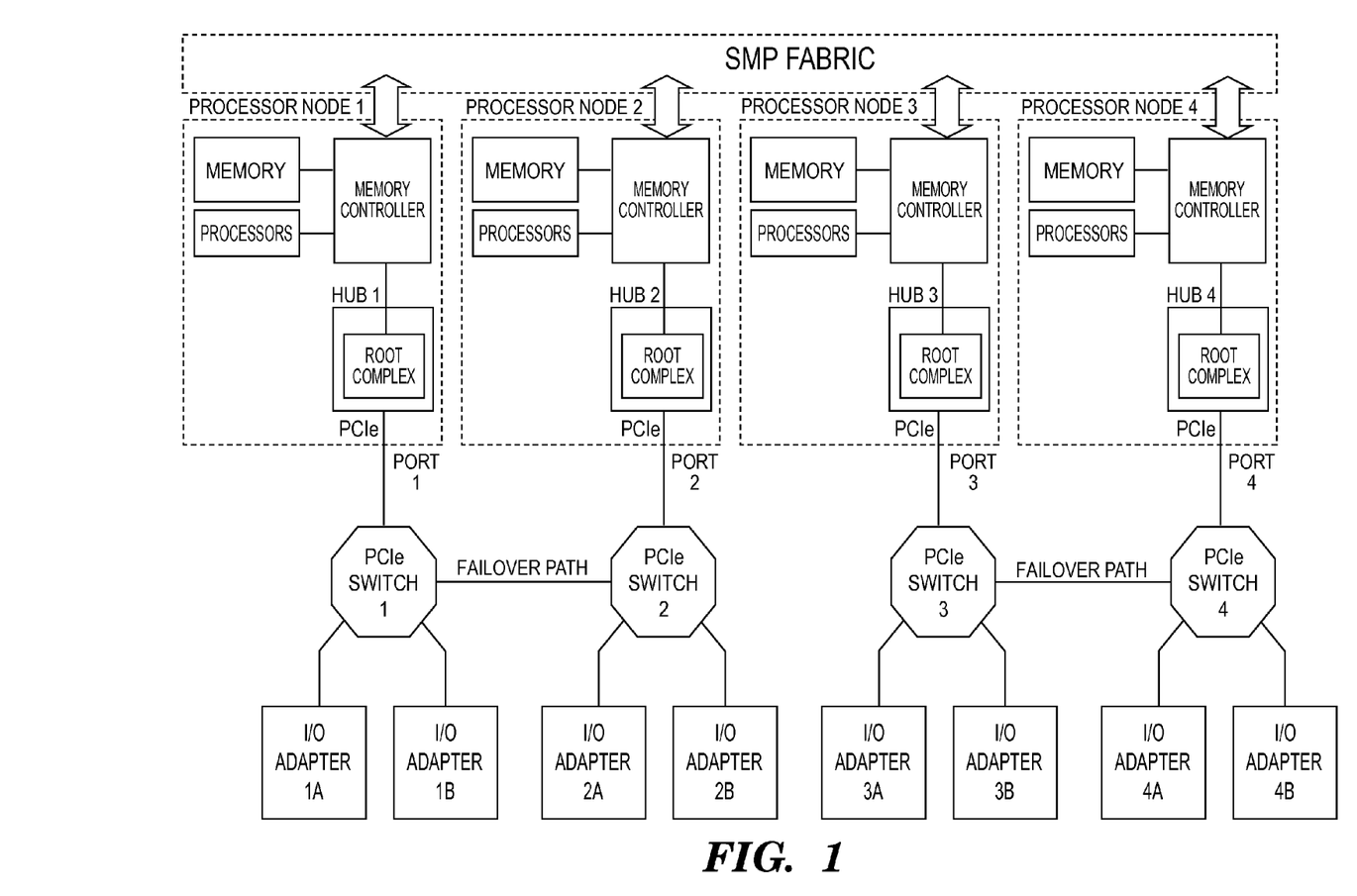
FIG. 1 depicts a block diagram of an exemplary computing system that may be implemented by an exemplary embodiment.

Briefly stated, current large computer systems or servers are often composed of several processor nodes, each having processors, memory, a memory controller and one or more I/O hubs providing one or more PCI ports. I/O devices or adapters are attached to the PCI ports through PCIe switches to provide connectivity as shown in FIG. 1. Typically, the processor nodes each own one or more adapters different from one another. For example, a processor node 1 owns an I/O adapter 1A and 1B, while a processor node 2 owns an I/O adapter 2A and 2B, etc. The processor nodes are interconnected through a Symmetric Multi-Processor (SMP) fabric, which allows all processors, memory, and I/O to have complete access to one other.

In large, multi-node servers, it is desirable to allow one or more processor nodes to be taken off-line for maintenance or reconfiguration (e.g., upgrades) while the other nodes remain operational and on-line. The processor node to be taken off-line is first quiesed by moving its work to the other processor nodes. When a processor node is taken off-line, it can no longer access its attached I/O. To make this I/O operational when its processor node is taken off-line, a secondary path or alternate route is provided according to an exemplary embodiment. Using the example above, if processor node 2 is taken off-line, connectivity is lost to I/O adapters 2A and 2B. However, a failover path between a PCIe switch connected to processor node 1 and a PCIe switch connected to processor node 2 may be activated by system firmware giving processor node 1 access to I/O adapters 2A and 2B in accordance with an exemplary embodiment. As such, one of the processor nodes can be evacuated in a controlled manner, which means that all memory in one processor node can be moved into another processor node on the fly. This process is referred to as a 'controlled failover', which is one type of failover condition or event.

Another case where the failover path is useful is in the case of a node or hub failure. This process is referred to as 'surprise failover', which is another type of failover condition. Although often disruptive to processing operations, the failover path can be activated to give access to the I/O adapters owned by the failed processor node, referred to herein as the 'affected' adapters or 'failover' adapters, to a surviving processor node according to an exemplary embodiment.

When the processor node is ready to be put back on-line, the 'affected' I/O is attached to the repaired or reconfigured processor node according to an exemplary embodiment. This process is referred to as 'failback'.

Figure 2A:
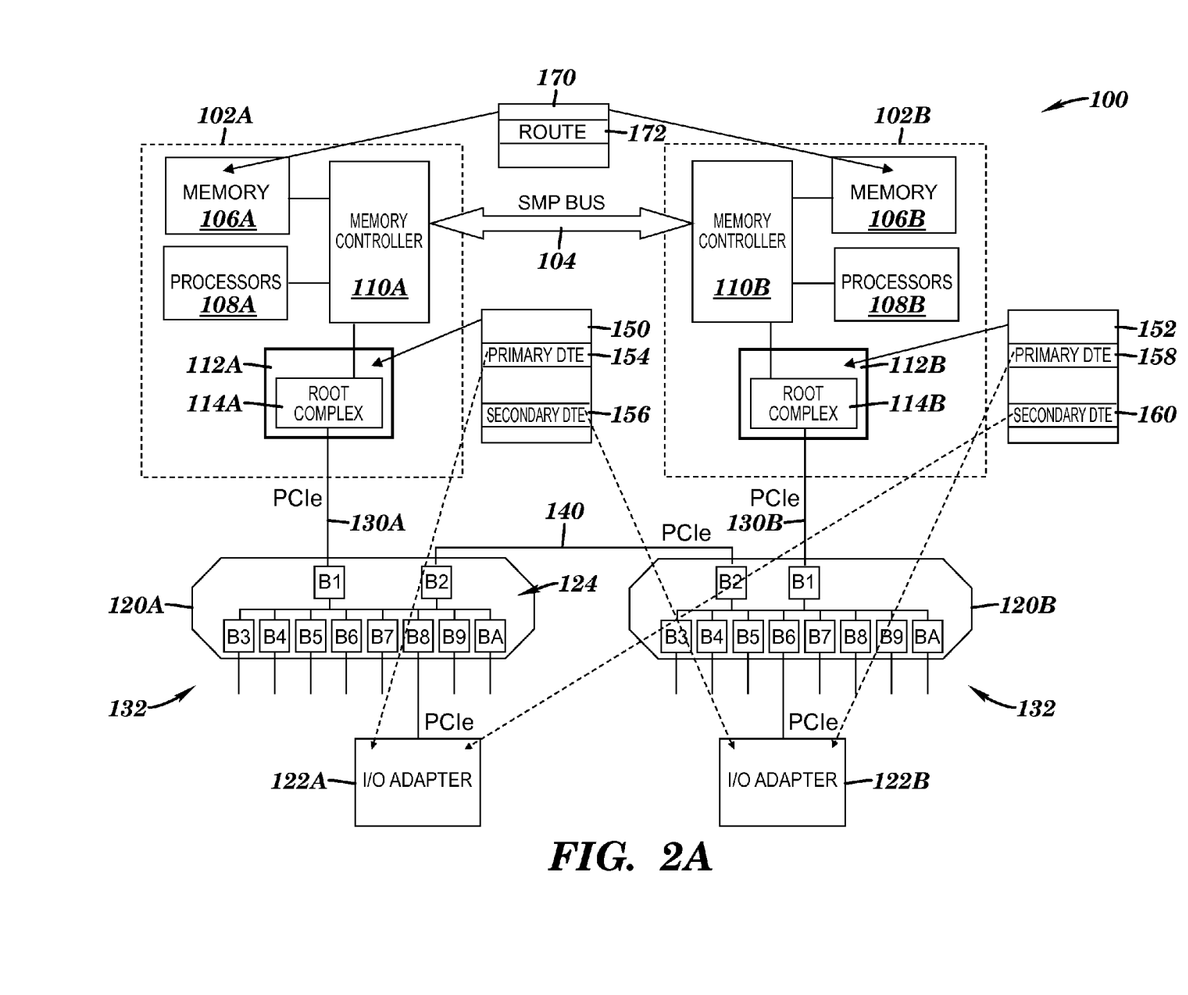
FIG. 2A depicts a block diagram of a computing system that may be implemented by an exemplary embodiment.

Turning now to FIG. 2A, a block diagram of a computing system 100 having an input/output (I/O) topology in which exemplary embodiments of the present invention may be implemented is provided. The system 100 can be any computing platform or processing system having an I/O interconnect topology as illustrated, and may utilize packetized communications for internal communications between elements. In an exemplary embodiment, the system 100 includes a failover control system that supports 'control failover', 'surprise failover' and 'failback' conditions in accordance with the present disclosure. In an exemplary embodiment, the system 100 is a System z® server offered by International Business Machines Corporation. System z® is based on the z/Architecture® offered by International Business Machines Corporation. Details regarding the z/Architecture® are described in an IBM® publication entitled, "z/Architecture Principles of Operation," IBM Publication No. SA22-7832-07, February 2009, which is hereby incorporated herein by reference in its entirety.

In an exemplary embodiment, system 100 is divided into one or more host processor nodes 102A, 102B in communication with one another via a symmetric multi-processor (SMP) bus 104. Although only two host processor nodes are depicted, the system 100 may include additional processors nodes. Each of the host processor nodes 102A, 102B includes a collection of processors, memory and I/O interfaces, which are connected together by the SMP bus 104, which supports all the coherency traffic and all the memory traffic within the system. Specifically, the host processor nodes 102A, 102B include memory device, generally depicted as memory 106A and 106B respectively, a processor 108A, 108B, a memory controller 110A, 110B, and a I/O hub 112A, 112B. The I/O hubs 112A, 112B respectively include conventional or standard root complexes 114A, 114B, which may be PCIe defined according to an exemplary embodiment. The SMP bus enables the processor nodes 102A, 102B to be connected to one another so that, for example, if processor node 102A wants data from the memory 106B of processor node 102B it does so through the SMP bus 104. Or, if processor node 102A modifies a piece of memory, it can tell processor node 102B that has a copy that it modified that copy and that the local copy in processor node 102B is no longer valid.

When the system 100 is in operation, each processor 108A, 108B is configured to execute instructions stored within system memory, to communicate data to and from system memory, and generally to control operations of the system 100 pursuant to the instructions. The processors 108A, 108B described herein can be any custom made or commercially available processor, a central processing unit (CPU), an auxiliary processor among several processors associated with the computer system, a semiconductor based micro-processor (the form of a microchip or chip set), a macro-processors, or generally any device for executing instructions. In an exemplary embodiment, each processor comprises a combination of hardware and/or software/firmware with a computer program that, when loaded and executed, permits the processor to operate such that it carries out the methods described herein. Although only one processor is depicted for each host processor node, each node may include additional processors. The processors execute the failover control systems and methods as described herein.

The system 100 may also comprise a switching environment, in particular switching fabric or switch assembly 120A, 120B to route packetized communications between the root complexes 112A, 112B and I/O peripheral devices or adapters, which are generally depicted as adapters 122A, 122B. Of course, one or more adapters can be located at each processor node; however, for ease of discussion only one adapter is shown at each processor node. Each switching assembly 120A, 120B may include a number of bridges 124, generally labeled as B1-BA, to provide the switching functionality. The bridges 124 may provide switching functionality in accordance with PCIe systems. Although only eight bridges for each switch assembly are shown in FIG. 2A for being coupled to adapters respectively, each switching assembly may include any number of bridges for coupling additional adapters. In this example, adapter 122A is coupled to the downstream port of bridge B8 of switch assembly 120A while adapter 122B is coupled to the downstream port of bridge B8 of switch assembly 120B. In accordance with an exemplary embodiment, each switching assembly 120A, 120B comprise of off-the-shelf PCIe chips for performing the switching functionality described herein.

Communication paths 130A, 130B couple the ports of I/O hubs 112A and 112B to switch assemblies 120A and 120B respectively, while communication paths 132 couple the ports of the bridges with the I/O adapters. The communication paths can be PCIe defined interfaces according to an exemplary embodiment. The communication paths 130A and 130B can each be PCIe defined interfaces that each allows one or more adapters to communicate with their respective root complex via their respective switch assembly during a normal mode operation. In general, all traffic from adapters coupled to switch assembly 120A goes through switch assembly 120A and up to processor node 102A while all traffic from adapters coupled to switch assembly 120B goes through switch assembly 120B and up to processor node 102B. For example, traffic from adapter 122A goes through communication path 132 up to switch assembly 120A (via bridge B8 and B1) to I/O hub 112A via communication path 130A. In this example, traffic from adapter 122B goes through communication path 132 up to switch assembly 120B (via bridge B6 and B1) to I/O hub 112B via communication path 130B during normal mode operation.

As used herein, the term "downstream" may be used to refer to communications in the direction from hub to adapter (e.g., from hub 112A to adapter 122A), while the term "upstream" may be used to refer to communications in the direction from adapter to I/O hub (e.g., from adapter 122A to I/O hub 112A). Although system 100 is illustrated as having several separate elements, one or more of the elements may be combined or more tightly integrated and may be implemented by combinations of software-configured elements, such as processors including digital signal processors (DSPs), and/or other hardware elements.

Figure 2B:
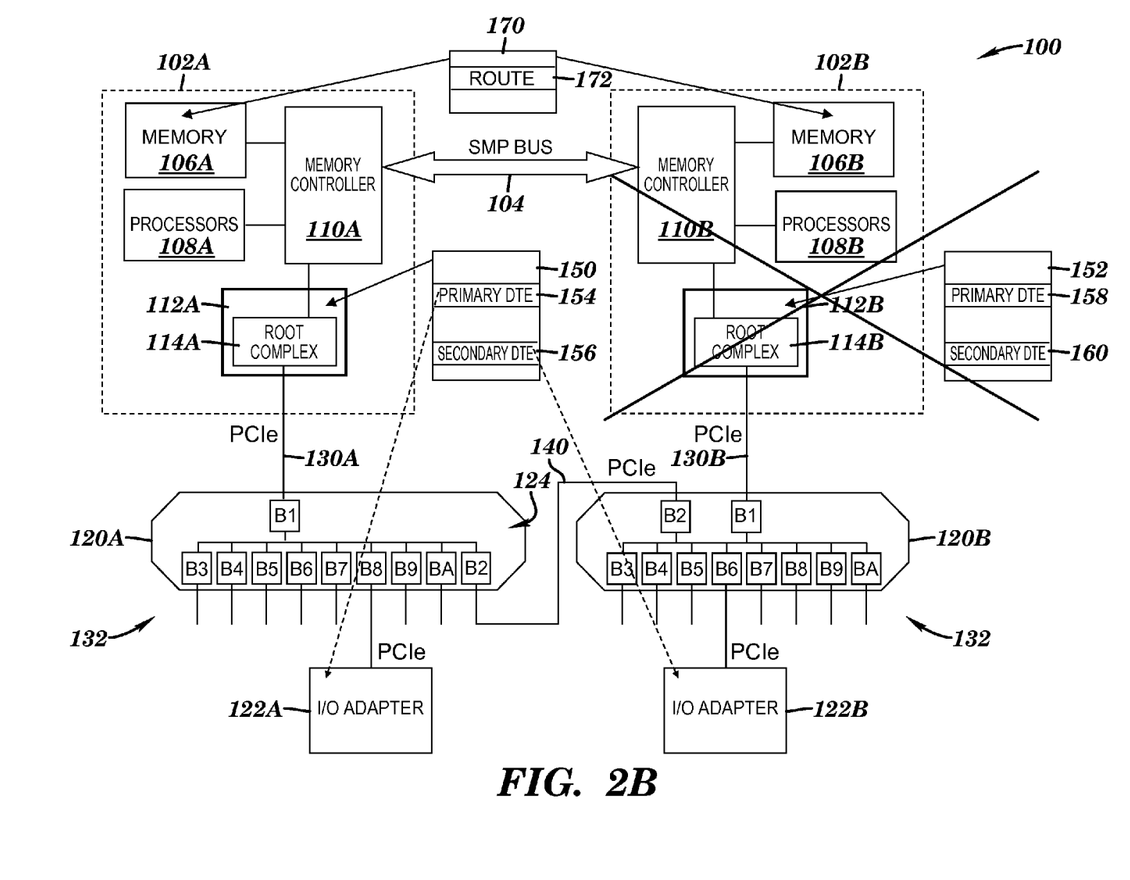
FIG. 2B depicts a block diagram of a computing system reconfigured upon a failover event that may be implemented by an exemplary embodiment.

In an exemplary embodiment, a failover path 140 is defined between switch assembly 120A and 120B. During normal mode operation, the failover path 140 is disabled providing no functional traffic over the failover path 140 as shown in FIG. 2A. Specifically, bridge B2 of switching assembly 120A and bridge B2 of switching assembly 120B that form the failover path, according to an exemplary embodiment, are in an idle state during normal mode operation and each operate as upstream facing bridges. As such, traffic from adapter 122A routes through bridge B8 up to bridge B1 of switch assembly 120A and to processor node 102A via I/O hub 112A while traffic from adapter 122B routes through bridge B6 up to bridge B1 of switch assembly 120B and to processor node 102B via I/O hub 112B. When one processor node wants to communicate to an adapter at another processor node, it does so through the SMP bus 104 and through the hub and switching assembly on the side of the other processor node. However, upon a failover condition (controlled or surprise) at, for example, processor node 102B, bridge B2 of switch assembly 120A and bridge B2 of switch assembly 120B are reconfigured by system firmware such that the failover path 140 is reconfigured to enable traffic to flow between switch assembly 120A and switch assembly 120B according to an exemplary embodiment. Specifically, bridge B2 of switch assembly 120A changes from being in an idle state to operating as a downstream facing bridge while bridge B2 of switch assembly 120B changes from being in an idle state to operating as an upstream facing bridge as shown in FIG. 2B. In this example, processor node 102B fails or is taken offline and the surviving processor node 102A communicates the reconfiguration information down through I/O hub 112A to switch assembly 120A and switch assembly 120B. As such, traffic from each adapter 122A, 122B is routed up to I/O hub 112A in the surviving processor node 102A with minimal traffic disruptions.

In accordance with one exemplary embodiment, each I/O hub includes and maintains a device table with a device table entry (DTE) for each adapter within the system enabling each I/O hub to communicate to each adapter including 'affected' adapters. As such, each I/O hub has its own device table. The device table of each I/O hub keeps track of everything the I/O hub needs to communicate with each adapter. Specifically, I/O hub 112A includes a device table 150 having a primary and secondary DTE, generally depicted as DTE 154 and 156, for adapter 122A and 122B respectively. I/O Hub 112B includes a device table 152 having a primary and secondary DTE, generally depicted as DTE 158 and 160, for adapter 122B and 122A respectively. Of course, each device table may include additional primary DTEs for each adapter it owns or is located on its side of the hub and additional secondary DTEs for each adapter located opposite its side of the hub. However, only a primary and second entry for each device (adapters 122A, 122B) are discussed to illustrate exemplary embodiments of the systems and methods of the present invention.

The primary DTE at each I/O hub is for the adapter and switch assembly at the side of that I/O hub. In this example, the primary DTE 154 at I/O hub 112A is for adapter 122A and the primary DTE 158 at I/O hub 112B is for adapter 122B. The secondary DTE at each I/O hub is used for the 'failover' adapter and switch assembly. In this example, the secondary DTE 156 at I/O hub 112A is for adapter 122B and the secondary DTE 160 at I/O hub 112B is for adapter 122A. Secondary DTEs at each I/O hub are preloaded to support 'failover' adapters and the corresponding switching assembly owned by another I/O hub. In other words, device table 150 has secondary DTE 156 preloaded to support adapter 122B and switch assembly 120B in the event processor node 102B fails (surprise) or is taken offline (controlled). Similarly, device table 152 has secondary DTE 160 preloaded to support adapter 122A and switching assembly 120A in the event processor node 102A fails or is taken offline. The secondary DTE in a device table at a surviving processor node for an adapter at a failed processor node is activated as an active entry by firmware running on the surviving processor node in the event of a failover condition. Otherwise, the secondary DTE in each device table is in standby until a failover condition occurs.

According to an exemplary embodiment, each adapter 122A, 122B has an entry in each device table 150, 152 to enable the processor nodes 102A, 102B to keep track of error state information, address translation protection (ATP) information, and interrupt information of each adapter 122A, 122B. Each DTE, whether activated or in standby, points to a particular adapter as shown in FIG. 2A. Activating a DTE for an adapter allows the I/O hub with the activated DTE to communicate to the adapter. Otherwise, the I/O hub is blocked from communicating to the adapter with a DTE in standby or in an idle state.

In an exemplary embodiment, the system 100 further includes a master device table or function table 170 with function table entries (FTEs) 172 each individually representing an end point or adapter within the I/O expansion network. The master device table 170 is accessible by each of the processor nodes 102A, 102B according to an exemplary embodiment. The master device table 170 includes routing information to identify to the processor in each of the first and second host processor nodes (102A, 102B) routing paths for communicating to each of the first and second adapters (122A, 122B). In the event of a failover, the surviving processor node can look to the master device table 170 for route information on how to communicate to an 'affected' adapter since the surviving processor node can no longer communicate to the 'affected' adapter at the 'failed' processor node through the SMP bus 104. As such, the master device table 170 is updated upon a failover event to identify new or alternate routings paths for each surviving processor node to take to communicate to each 'affected' adapter. For example, when processor node 102B fails or is taken off-line, processor node 102A looks to the master device table 170 for an alternate route to communicate to adapter 122B. In this example, the new route would be through I/O hub 112A down to switch assembly 120A and over to switch assembly 120B. The master device table 170 allows each processor node 102A, 102B to have complete connectivity to all adapters 122A, 122B at any given time.

In an exemplary embodiment, the device tables 150, 152 and the master device table 170 each get updated by firmware so that the surviving hub can keep track of each adapter and the surviving processor can identify which route to take to communicate to each 'affected' adapter. As such, with controlled failover PCI packets are not lost during a failover.

In accordance with an exemplary embodiment, each adapter 122A, 122B has a 'bus master enable' bit that selectively stops an adapter from generating new requests over the PCIe communication paths towards a hub. System firmware manipulates the bus master enable bit of each 'affected' adapter during a controlled failover or failback according to an exemplary embodiment. For example, during failover when processor node 102B is taken off-line or put back on-online (failback), the bus master enable bit of adapter 122B is turned off or reset stopping or suspending the 'affected' adapter (adapter 122B) from generating new requests over the PCIe bus. The bus master enable bit may be turned back on once traffic has properly moved from the failed processor node to the surviving processor node or once the failed processor node has been fixed and turned back on. Manipulating the bus master enable bit during controlled failover or failback prevents packets from being in the fabric and thus be potentially lost. System firmware also stops the processors from generating any new requests to the 'affected' adapters by marking all entries in the master function table 170 for 'affected' adapters as 'temporarily unavailable' according to an exemplary embodiment.

To ensure that all previous requests have completed, firmware queries a 'busy bit' on each of the adapters to make sure that the adapters have received all their completions according to an exemplary embodiment. Firmware also checks the status in the host to make sure the host has received all its completions according to an exemplary embodiment. As such, packets are blocked from flowing through the PCIe fabric (including switches) during the reconfiguration preventing packets from getting lost and thus potentially causing either more extensive recovery or a data integrity problem.

In accordance with an exemplary embodiment, all components within the I/O expansion network are assigned by firmware with unique PCI bus numbers and unique PCI address routing ranges in a way that allows unique address mapping and bus numbers both in the normal and failover case. As such, firmware does not have to reset every PCI-to-PCI bridge or every register making all the components unique across the whole failover domain.

In general, requests originating in the Root Complex towards the I/O adapter are 'address routed,' and the switches examine the PCIe address to determine the destination. To accomplish this, the PCIe address space is divided into multiple ranges, one range for each PCIe I/O adapter. Each south facing PCIe to PCIe bridge in the switch assemblies contains address registers specifying the PCIe address range that it will use to capture PCIe packets and send them downstream to an attached I/O adapter (or another PCIe switch). If the PCIe address in a packet falls within a bridge's address range, the packet is forwarded. If the PCIe address in the packet falls outside of the bridge's address range, the packet is not forwarded. In addition, the I/O adapter also examines the PCIe address in the packet to ensure that the packets are to be accepted by the I/O adapter.

System firmware is responsible for setting all the address routing registers in the bridges so that each bridge has a unique address range. It also sets the address range checking in the I/O adapter to have the same or subsets of the ranges set in the corresponding bridges. These address ranges in the I/O adapter are called BARs, or Base Address Registers. For example, if the system wants to send a request to adapter 122A attached to switch assembly 120A, it uses a PCIe address that falls within the address range set in bridge 8 (B8) and this address must also fall within the adapter's (adapter 122A) address ranges.

Even though the two root complexes in the failover domain, one in hub 112A and the other in hub 112B, could use the same PCIe address ranges in normal mode, in failover mode, the address ranges of both switches must be unique. It is therefore desirable to have unique address ranges over both root complexes in normal mode to minimize the amount of reconfiguration of address range registers in the bridges. Failover must be performed in a timely manner to avoid timeouts.

Similar to address routing, completions originating in the root complex towards the I/O adapter are 'bus number routed,' and the switches examine the PCIe bus number to determine the destination. To accomplish this, the PCIe bus number space is divided into multiple ranges, one range for each PCIe I/O adapter. Each south facing PCIe to PCIe bridge in the switch assembly contains bus number registers specifying the PCIe bus number range that it will use to capture PCIe packets and send them downstream to an attached I/O adapter (or another PCIe switch). If the PCIe bus number in a packet falls within a bridge's bus number range, the packet is forwarded. If the PCIe bus number in the packet falls outside of the bridge's bus number range, the packet is not forwarded. In addition, the I/O adapter also examines the PCIe bus number in the packet to ensure that the packets are to be accepted by the I/O adapter.

System firmware is responsible for setting all the bus number routing registers in the bridges so that each bridges has a unique bus number range. It also sets the bus number(s) in the I/O adapter to have the same or subsets of the ranges set in the corresponding bridges. The bus numbers in the I/O adapter are set by the bus number in certain Configuration Request packets. For example, if the system wants to send a completion to adapter 122A attached to switch assembly 120A, it uses a PCIe bus number that falls within the bus number range set in bridge 8 (B8) and this bus number must also match the bus number in adapter 122A.

Even though the two root complexes in the failover domain, one in I/O hub 112A and the other in I/O hub 112B, could use the same PCIe bus number ranges in normal mode, in failover mode, the bus number ranges of both switches must be unique. It is therefore desirable to have unique bus number ranges over both root complexes in normal mode to minimize the amount of reconfiguration of bus number range registers in the bridges. Failover must be performed in a timely manner to avoid timeouts.

Figure 3:
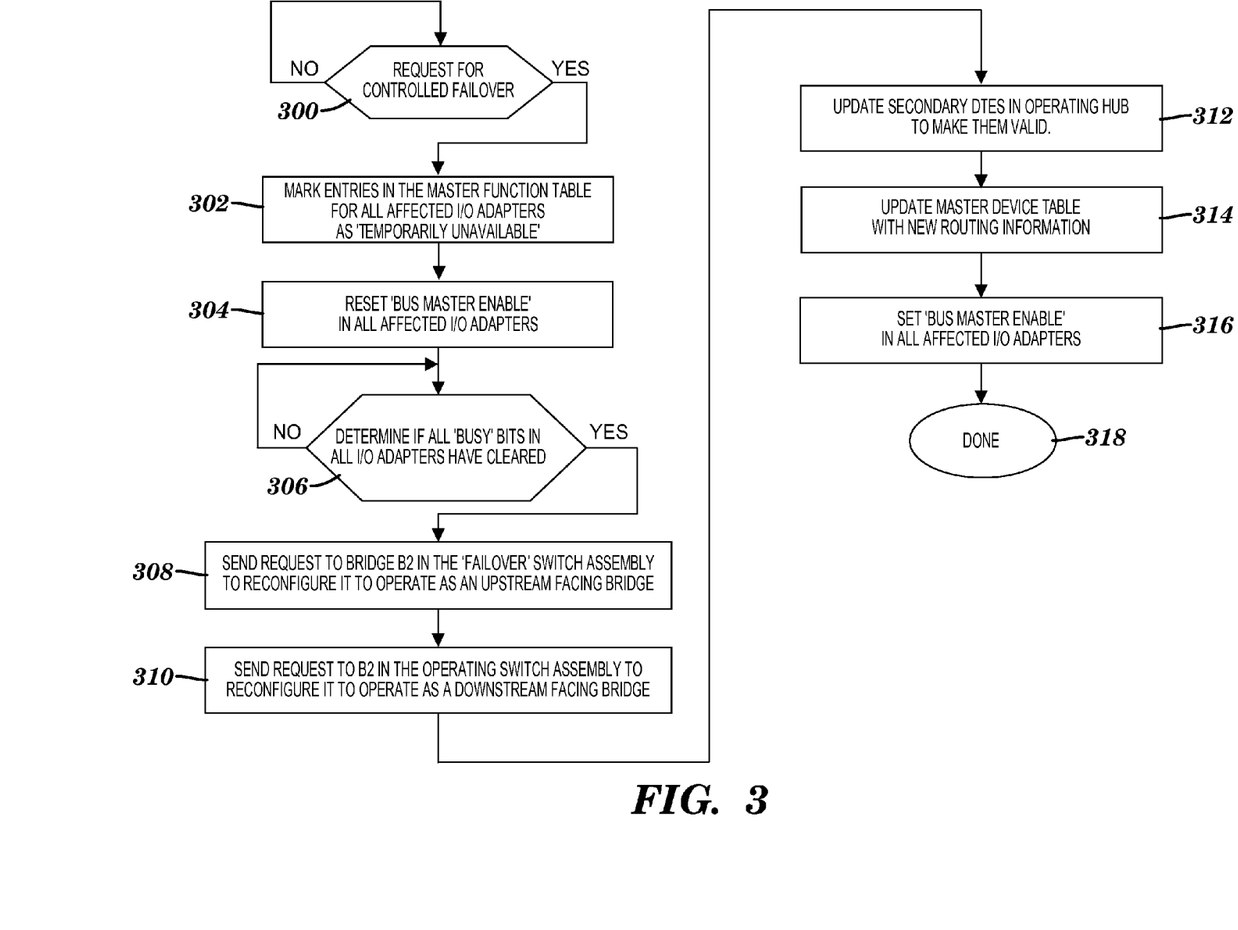
FIG. 3 depicts a flow diagram illustrating a method for controlled failover that may be implemented by an exemplary embodiment.

FIG. 3 illustrates a process flow diagram of a controlled failover according to an exemplary embodiment of the present invention. This controlled failover process is described using the example above where processor node 102B is taken off-line. Of course, a similar process may be performed when processor node 102A is taken off-line. At block 300, request for a controlled failover. The controlled failover allows memory in a processor node to be evacuated and placed in memory of another processor node. This is useful for repairing a node or upgrading a node. At block 302, mark entries in the master function table 170 for all affected I/O adapters as 'temporarily unavailable'. In this example, adapter 122B is marked as temporarily unavailable. Next, reset the 'bus master enable' bit in all affected adapters at block 304. This prevents all affected adapters (e.g., adapter 122B) from generating new requests over the PCIe communication paths towards a hub. Then, determine if the 'busy' bits in all adapters have cleared at block 306. In accordance with an exemplary embodiment, system firmware queries the busy bit in each adapter to make sure that the adapters have received all their completions and the firmware checks the status in the host to make sure the host has received all its completions according to an exemplary embodiment. If the answer to block 306 is no, then continue at block 306. If the answer to block 306 is yes, then send a request to bridge B2 in the 'failover' switch assembly (120B) to reconfigure it to operate as an upstream facing bridge at block 308. At block 310, send a request to bridge B2 in the operating switch assembly (120A) to reconfigure it to operate as a downstream facing bridge. In accordance with an exemplary embodiment, firmware sends the requests to the bridges. Then, update secondary DTEs in operating hub (112A) to make them valid at block 312. In this example, secondary DTE 156 for 'affected' adapter 122B is updated as an active entry. At block 314, update master device table 170 with new routing information. Next, set 'bus master enable' bit in all affected I/O adapters at block 316. Controlled failover is completed at block 318.

Figure 4:
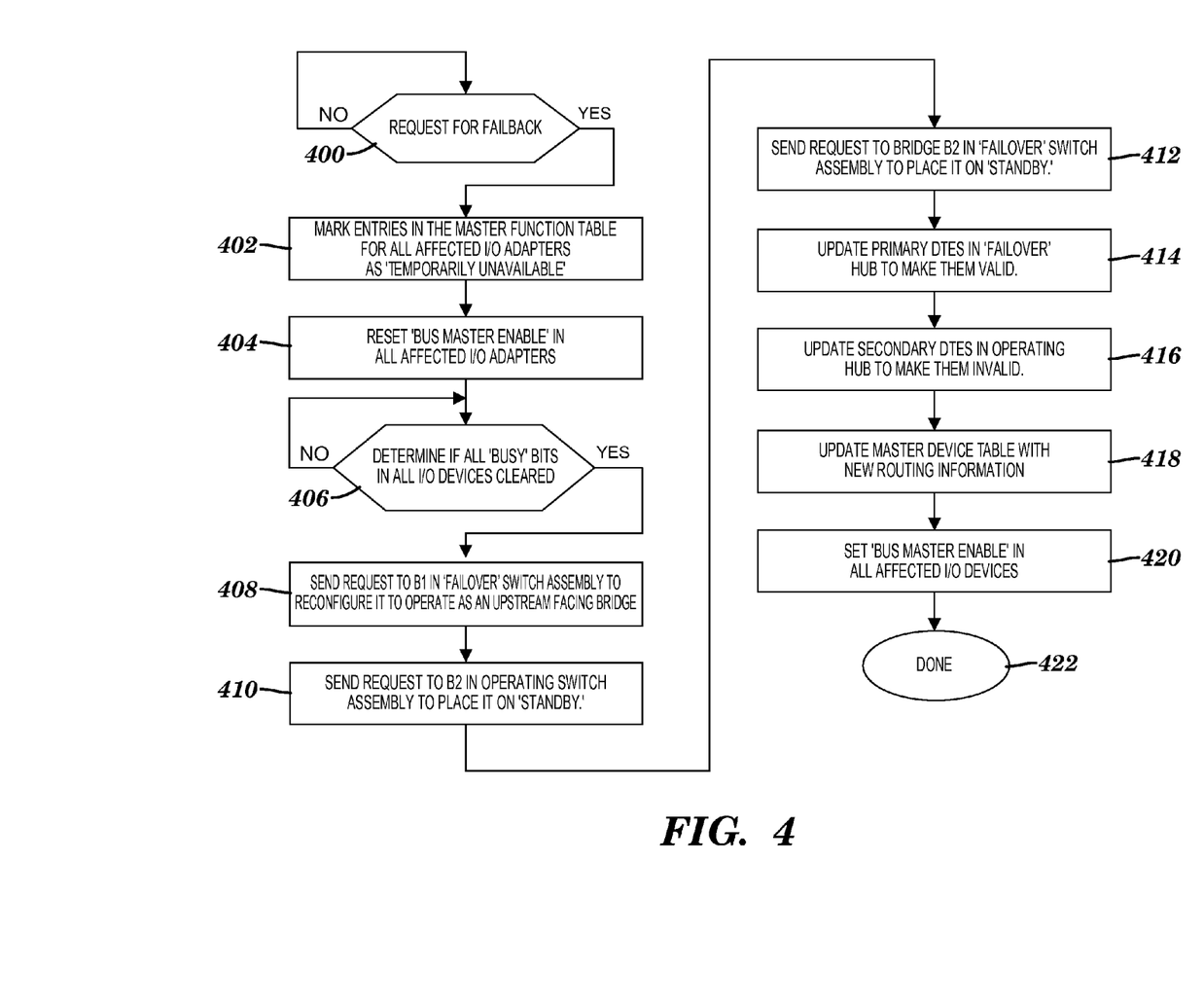
FIG. 4 depicts a flow diagram illustrating a method for failback control that may be implemented by an exemplary embodiment.

FIG. 4 illustrates a process flow diagram of a failback process according to an exemplary embodiment of the present invention. The failback process is described using the example above where processor node 102B was taken off-line but now is put back on-line. At block 400, request for a failback. At block 402, mark entries in the master function table 170 for all affected I/O adapters as 'temporarily unavailable'. Next, reset the 'bus master enable' bit in all affected adapters at block 404. Then, determine if the 'busy' bits in all adapters have cleared at block 406. If the answer to block 406 is no, then continue at block 406. If the answer to block 406 is yes, then send a request to bridge B1 of the 'failover' switch assembly (120B) to reconfigure it to operate as an upstream facing bridge at block 408. At block 410, send a request to bridge B2 in the operating switch assembly (120A) to place it on 'standby'. This prevents traffic from flowing from the 'failover' switching assembly (120B) to the operating switch assembly (120A). At block 412, send a request to bridge B2 in the 'failover' switch assembly (120B) to place it on 'standby'. Placing bridge B2 of the operating and 'failover' switching assemblies helps prevent traffic from flowing between the 'failover' and operating switch assembly. In accordance with an exemplary embodiment, firmware sends the requests to the bridges. Then, update primary DTEs in 'failover' hub (112B) to make them valid at block 414. In this example, primary DTE 158 is put back as a valid entry. At block 416, update secondary DTEs in operating hub (112A) to make them invalid. In this example, secondary DTE 156 is placed back in standby. At block 418, update master device table 170 with new routing information. Next, set 'bus master enable' bit in all affected I/O adapters at block 420. Failback is completed at block 422.

Figure 5:
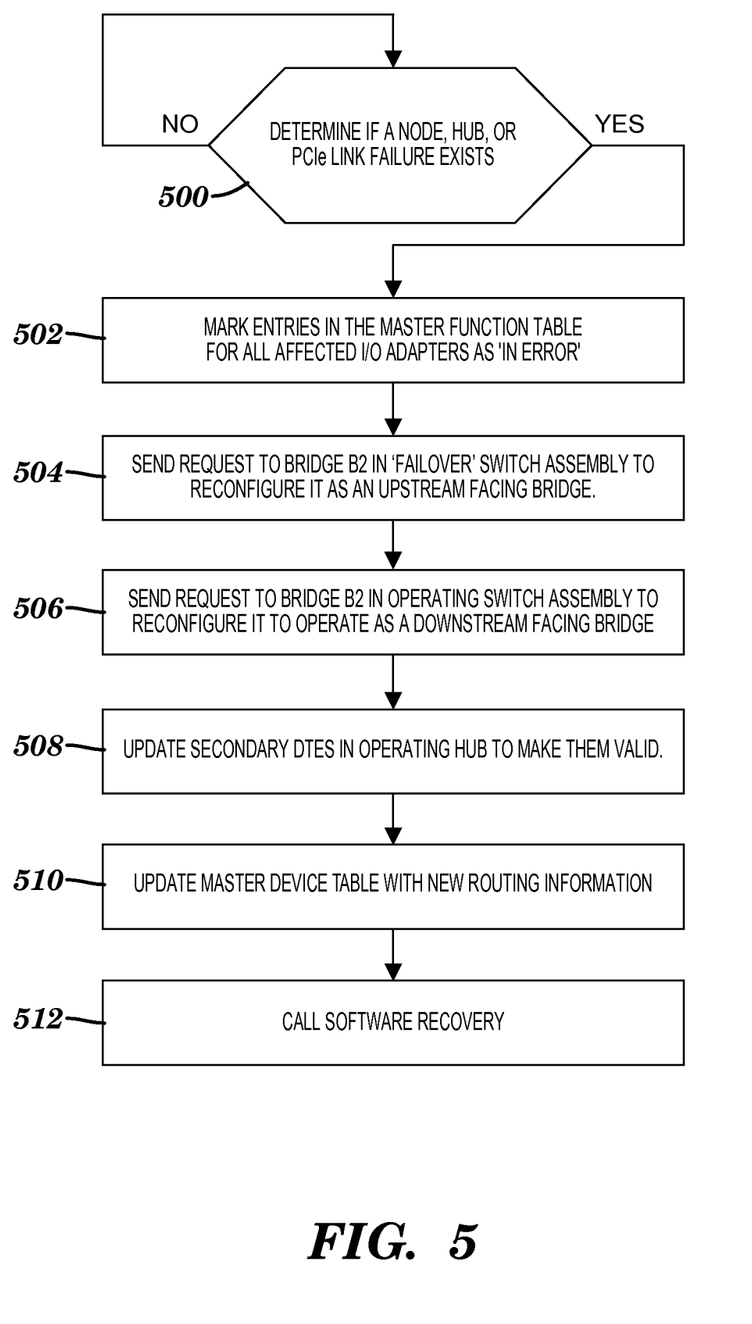
FIG. 5 depicts a flow diagram illustrating a method for surprise failover that may be implemented by an exemplary embodiment.

FIG. 5 illustrates a process flow diagram of a surprise failover according to an exemplary embodiment of the present invention. At block 500, determine if a node, hub, or PCIe bus failure exists. If the answer is yes, mark entries in the master function table 170 for all affected I/O adapters as 'in error' at block 502. Then, send a request to bridge B2 of the 'failover' switch assembly (120B) to reconfigure it to operate as an upstream facing bridge at block 504. At block 506, send a request to bridge B2 of the operating switch assembly (120A) to reconfigure it to operate as a downstream facing bridge. Then, update secondary DTEs in operating hub (112A) to make them valid at block 508. At block 510, update master device table 170 with new routing information. Call software recovery at block 512. At block 512, software recovery is called by firmware in order to recover packets that may be lost. This invokes recovery code at the operating system to resynchronize or fix the failed node, hub, or PCIe link according to an exemplary embodiment.

Technical effects and benefits include the ability to control failover in a multi-processor system with reduced failover time using off-the-shelf PCIe fan-out chips (switch assemblies). This may minimize traffic disruption and failover latencies in a PCIe environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As used herein, the term "controller" refers to an application specific integrated circuit (ASIC), an electronic circuit, a processor (shared, dedicated, or group) and memory that executes one or more software or firmware programs, a combinational logic circuit, and/or other suitable components that provide the described functionality.

The methods described herein can be performed or executed by any single processor, controller or a combination thereof or by multiple a number of processors, controllers or a combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "controller" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
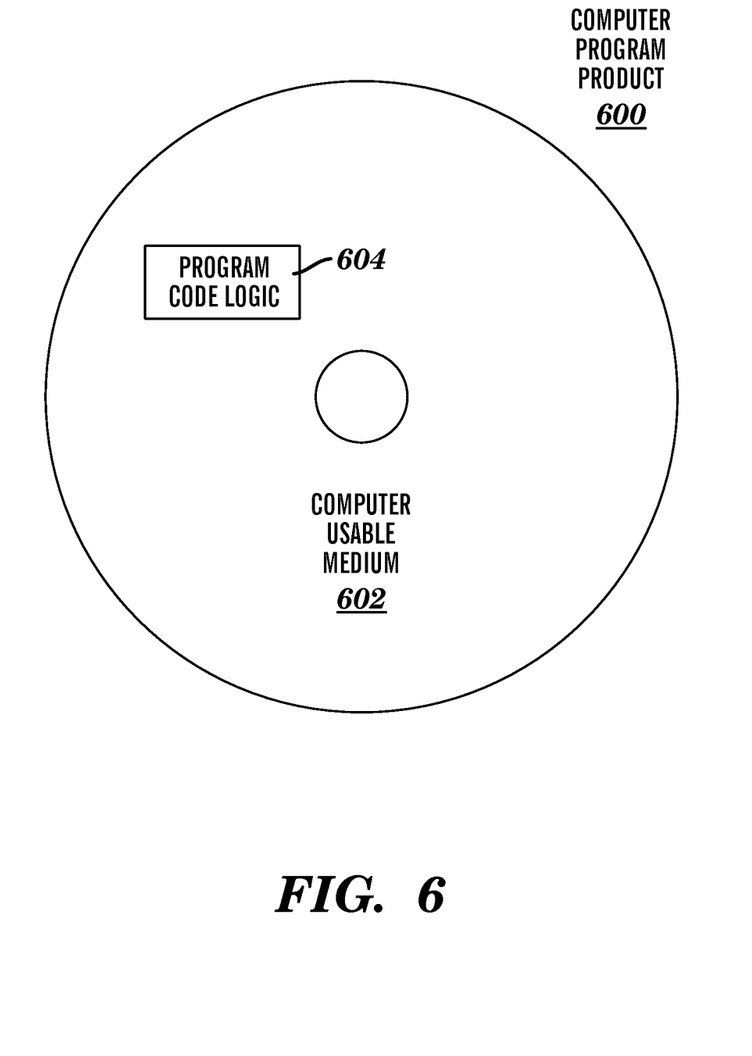
FIG. 6 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 600 as depicted in FIG. 6 on a computer usable medium 602 with computer program code logic 604 containing instructions embodied in tangible media as an article of manufacture. Exemplary articles of manufacture for computer usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method for failover control in a computer system, the method comprising:
    maintaining a primary device table entry (DTE) in a first device table activated for a first adapter in communication with a first host processor node having a first root complex via a first switch assembly and maintaining a secondary DTE in the first device table in standby for a second adapter in communication with a second host processor node having a second root complex via a second switch assembly;
    maintaining a primary DTE in a second device table activated for the second adapter and maintaining a secondary DTE in the second device table in standby for the first adapter; and
    upon a failover condition, updating the secondary DTE in the first device table as an active entry for the second adapter and forming a failover path to enable traffic to route from the second adapter through the second switch assembly over to the first switch assembly and up to the first root complex of the first host processor node.

2. The method of claim 1, wherein each DTE for each adapter enables each host processor node to communicate to each adapter.

3. The method of claim 1, wherein each DTE for each adapter in each device table includes error state information, address translation protection information, interrupt information or a combination thereof.

4. The method of claim 1, further comprising maintaining a third device table accessible by each of the first and second host processor nodes, the third device table includes function table entries that identify to a processor in each of the first and second host processor nodes routing information for communicating to each of the first and second adapters.

5. The method of claim 4, further comprising updating the third device table in response to the failover condition to identify a new routing path for the first host processor node to take to communicate to the second adapter.

6. The method of claim 1, wherein forming the failover path comprises reconfiguring an upstream-facing bridge in the first switch assembly to operate as a down-stream facing failover bridge and reconfiguring a downstream-facing bridge in the second switch assembly to operate as an upstream-facing failover bridge.

7. The method of claim 1, further comprising resetting a first bit in the second adapter to stop the second adapter from generating new requests to the first and second host processor nodes.

8. The method of claim 1, wherein the first processor node is in signal communication with the second processor node via a single symmetric multi-processor bus.

9. A hardware computer system for failover control, comprising:
    a first host processor node comprising a first device table and a first root complex configured to communicate with a first adapter via a first switch assembly, and a second host processor node comprising a second device table and a second root complex configured to communicate with a second adapter via a second switch assembly, the system configured to perform a method comprising:
    maintaining a primary device table entry (DTE) in the first device table activated for the first adapter and maintaining a secondary DTE in the first device table in standby for the second adapter;
    maintaining a primary DTE in the second device table activated for the second adapter and a secondary DTE in the second device table in standby for the first adapter; and
    upon a failover condition, updating the secondary DTE in the first device table as an active entry for the second adapter and forming a failover path to enable traffic to route from the second adapter through the second switch assembly over to the first switch assembly and up to the first root complex of the first host processor node.

10. The computer system of claim 9, wherein each DTE for each adapter enables each host processor node to communicate to each adapter.

11. The computer system of claim 9, wherein each DTE for each adapter in each device table includes error state information, address translation protection information, interrupt information or a combination thereof.

12. The computer system of claim 9, further comprising a third device table in system memory accessible by each of the first and second host processor node, the third device table includes function table entries that identify to a processor in each of the first and second host processor nodes routing information for communicating to each of the first and second adapters.

13. The computer system of claim 12, wherein the third device table is updated in response to the failover condition to identify a new routing path for the first host processor node to take to communicate to the second adapter.

14. The computer system of claim 9, wherein the failover path is formed by reconfiguring an upstream-facing bridge in the first switch assembly to operate as a downstream-facing failover bridge and reconfiguring a downstream-facing bridge in the second switch assembly to operate as an upstream-facing failover bridge.

15. The computer system of claim 9, wherein the first and second adapter includes a first bit each selectively set to stop the adapter from generating new requests to either host processor nodes.

16. The computer system of claim 9, wherein the first processor node is in signal communication with the second processor node via a single symmetric multi-processor bus.

17. A computer program product for failover control in a computer system, the computer program product comprising:
    a non-transitory computer-readable storage medium readable by a processing circuit and storing instructions for execution by the processing circuit for performing a method comprising:
    maintaining a primary device table entry (DTE) in a first device table activated for a first adapter in communication with a first host processor node having a first root complex via a first switch assembly and maintaining a secondary DTE in the first device table in standby for a second adapter in communication with a second host processor node having a second root complex via a second switch assembly;

maintaining a primary DTE in a second device table activated for the second adapter and maintaining a secondary DTE in standby in the second device table for the first adapter; and upon a failover condition, updating the secondary DTE in the first device table as an active entry for the second adapter and forming a failover path to enable traffic to route from the second adapter through the second switch assembly over to the first switch assembly and up to the first root complex of the first host processor node.

18. The computer program product of claim 17, wherein each DTE for each adapter enables each host processor node to communicate to each adapter.

19. The computer program product of claim 17, wherein each DTE for each adapter in each device table includes error state information, address translation protection information, interrupt information or a combination thereof.

20. The computer program product of claim 17, wherein the method further comprises maintaining a third device table accessible by each of the first and second host processor nodes, the third device table includes function table entries that identify to a processor in each of the first and second host processor nodes routing information for communicating to each of the first and second adapters.

21. The computer program product of claim 20, wherein the method further comprises updating the third device table in response to the failover condition to identify a new routing path for the first host processor node to take to communicate to the second adapter.

22. The computer program product of claim 17, wherein the method of forming the failover path comprises reconfiguring an upstream-facing bridge in the first switch assembly to operate as a down-stream facing failover bridge and reconfiguring a downstream-facing bridge in the second switch assembly to operate as an upstream-facing failover bridge.

23. The computer program product of claim 17, wherein the method further comprises resetting a first bit in the second adapter to stop the second adapter from generating new requests to the first and second host processor nodes.

24. The computer program product of claim 17, wherein the first processor node is in signal communication with the second processor node via a single symmetric multi-processor bus.

* * * * *